US008811210B2

(12) United States Patent
Narsimha et al.

(10) Patent No.: US 8,811,210 B2
(45) Date of Patent: Aug. 19, 2014

(54) EFFECTIVE APPLICATION DENSITIES FOR FABRICS

(75) Inventors: Reddy C. Narsimha, Hyderabad Andhra Pradesh (IN); Bezawada Suresh, Hyderabad Andhra Pradesh (IN); Rajashekar Dasari, Hyderabad Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 42 days.

(21) Appl. No.: 13/372,175

(22) Filed: Feb. 13, 2012

(65) Prior Publication Data

US 2013/0208602 A1 Aug. 15, 2013

(51) Int. Cl.
*H04L 12/26* (2006.01)
*H04L 12/56* (2006.01)
*H04L 12/24* (2006.01)

(52) U.S. Cl.
CPC ............ *H04L 47/286* (2013.01); *H04L 49/505* (2013.01); *H04L 43/16* (2013.01); *H04L 41/0213* (2013.01); *H04L 43/0852* (2013.01)
USPC .......................................... 370/252; 370/401

(58) Field of Classification Search
CPC ...................................................... H04L 43/16
See application file for complete search history.

(56) References Cited

U.S. PATENT DOCUMENTS

| | | | |
|---|---|---|---|
| 7,519,964 B1 | 4/2009 | Islam et al. | |
| 7,602,774 B1 | 10/2009 | Sundaresan et al. | |
| 2003/0151619 A1* | 8/2003 | McBride | 345/736 |
| 2007/0028001 A1* | 2/2007 | Phillips et al. | 709/238 |
| 2008/0189418 A1 | 8/2008 | Kimbrel et al. | |
| 2008/0256531 A1 | 10/2008 | Gao et al. | |
| 2009/0222504 A1 | 9/2009 | Vandanapu | |
| 2009/0313319 A1 | 12/2009 | Beisiegel et al. | |
| 2012/0047249 A1* | 2/2012 | Bharadwaj et al. | 709/224 |
| 2012/0254268 A1* | 10/2012 | Carmichael | 707/827 |

* cited by examiner

*Primary Examiner* — David Oveissi

(57) ABSTRACT

A non-transitory machine-readable storage device includes executable instructions that, when executed, cause one or more processors to calculate an effective application density for switches in fabrics. The processors are further caused to calculate an effective application density for the fabrics using the switch application densities. The processors are further caused to recommend deployment of an application on a first switch in a first fabric if the effective application density of the first switch is below a first threshold and the effective application density of the first fabric is below a second threshold.

15 Claims, 4 Drawing Sheets

EFFECTIVE APPLICATION DENSITIES FOR FABRICS

BACKGROUND

In datacenters, applications are deployed over multiple hosts or servers that typically handle one component each. For example a host may provide a database of the application, may be a file server for the application, or may provide backup services to an application. The hosts are coupled by switches that make up fabrics of a network. The communication between hosts can impact the effectiveness of the application, resulting in higher network traffic, redundant input/output ("I/O") accesses to memory, and sluggish processing during run-time of the application.

BRIEF DESCRIPTION OF THE DRAWINGS

For a detailed description of exemplary examples, reference will now be made to the accompanying drawings in which.

DETAILED DESCRIPTION

In datacenters, applications are elements that are monitored continuously. Applications in datacenters are assigned logical unit numbers ("LUNs") from various storage arrays with multiple I/O paths enabled for each LUN on the fabrics. A fabric is a framework of interconnected host systems, switches, and storage systems. One of the challenges in application deployment is identifying a switch configuration in order to effectively utilize storage area network ("SAN") bandwidth. This disclosure identifies metrics of fabric and switch configurations such that the applications may be deployed efficiently. Some of these metrics are switch application density, fabric application density, effective switch application density, and effective fabric application density (described below). Additionally, these metrics allow for more efficient network maintenance, especially regarding switch ports.

Figure 1A:
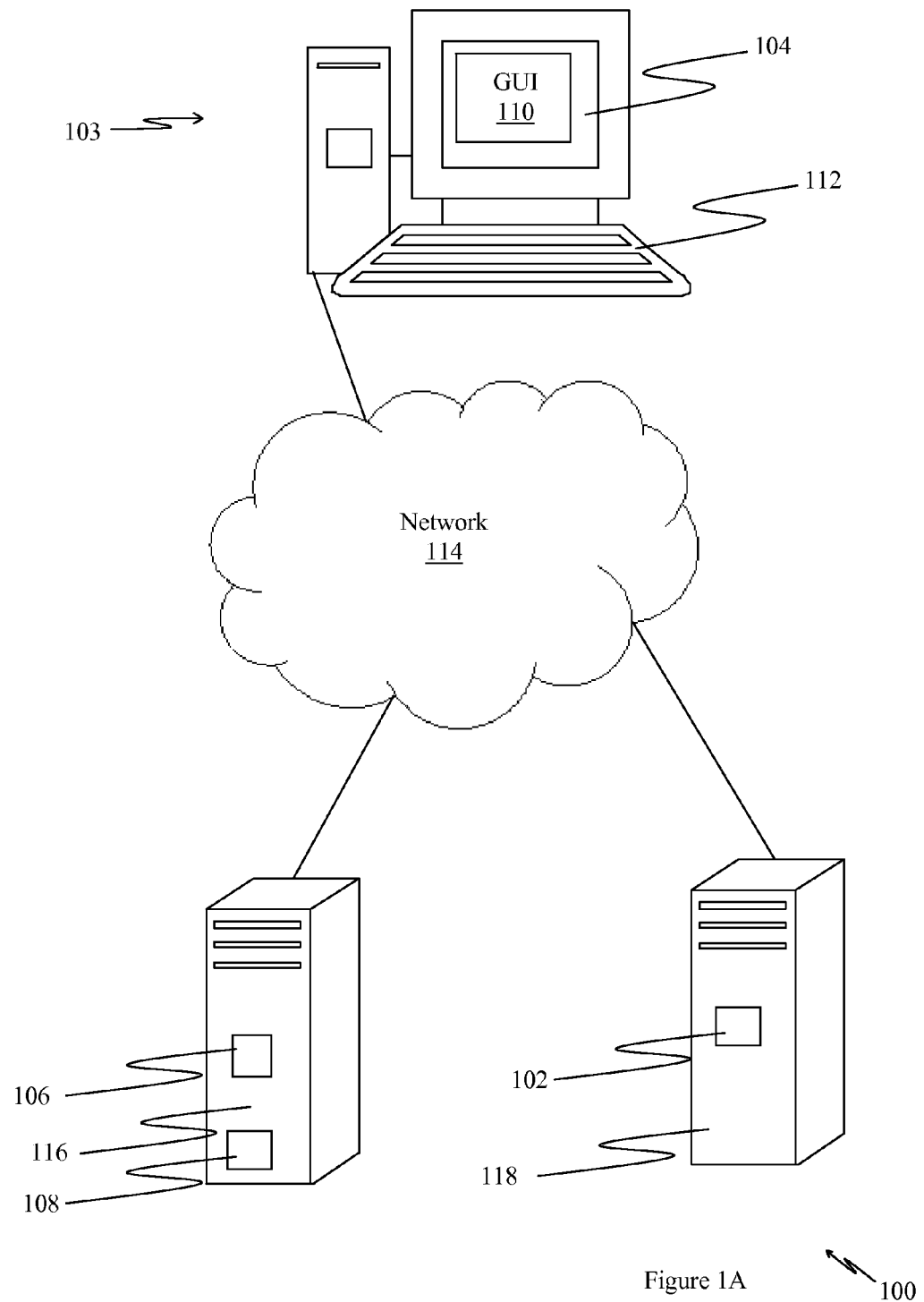
FIGS. 1A and 1B illustrate a network for calculating effective application densities for fabrics in accordance with various illustrated examples.

Turning to FIG. 1A, components of the system 100 are distributed over a network 114 in at least one example. Different portions of an application may be distributed among multiple servers 116, 118 or hosts that also make up the network 114. For example, server 116 may provide storage 108 and processing 106 for an application while server 118 may provide a database 102 to the application. One or more processors 106 may execute software located on a computer-readable medium in the servers 116, 118. A user may interact with a graphical user interface ("GUI") 110 on workstation 103, e.g., by manipulating a keyboard 112 or mouse (not shown), and transmit information over the network 114 for processing by servers 116, 118. The user may receive output from the network 114 via display 104 including the metrics described herein, application installation recommendations, etc. The user may accept or reject the recommendations using the GUI 110.

Figure 1B:
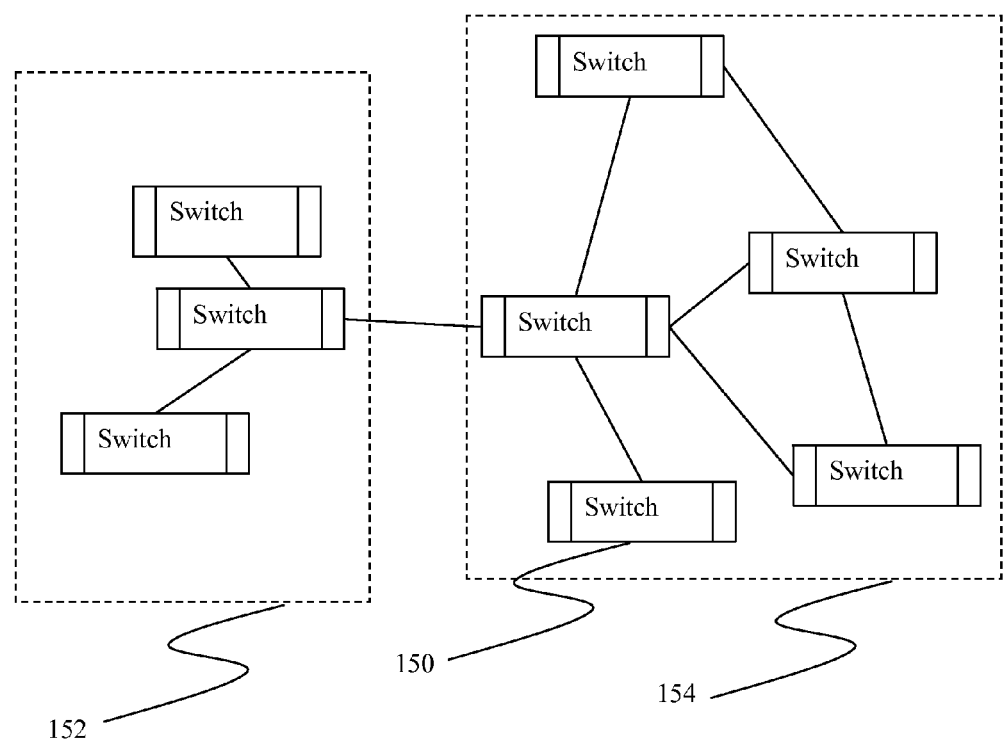
Figure 1B:

FIG. 1B illustrates network 114 components (e.g., switches 150) organized into two coupled fabrics 152, 154. The network elements may include switches, routers, storage servers, processing servers, thin clients, and other network elements that make up a fabric.

Figure 2:
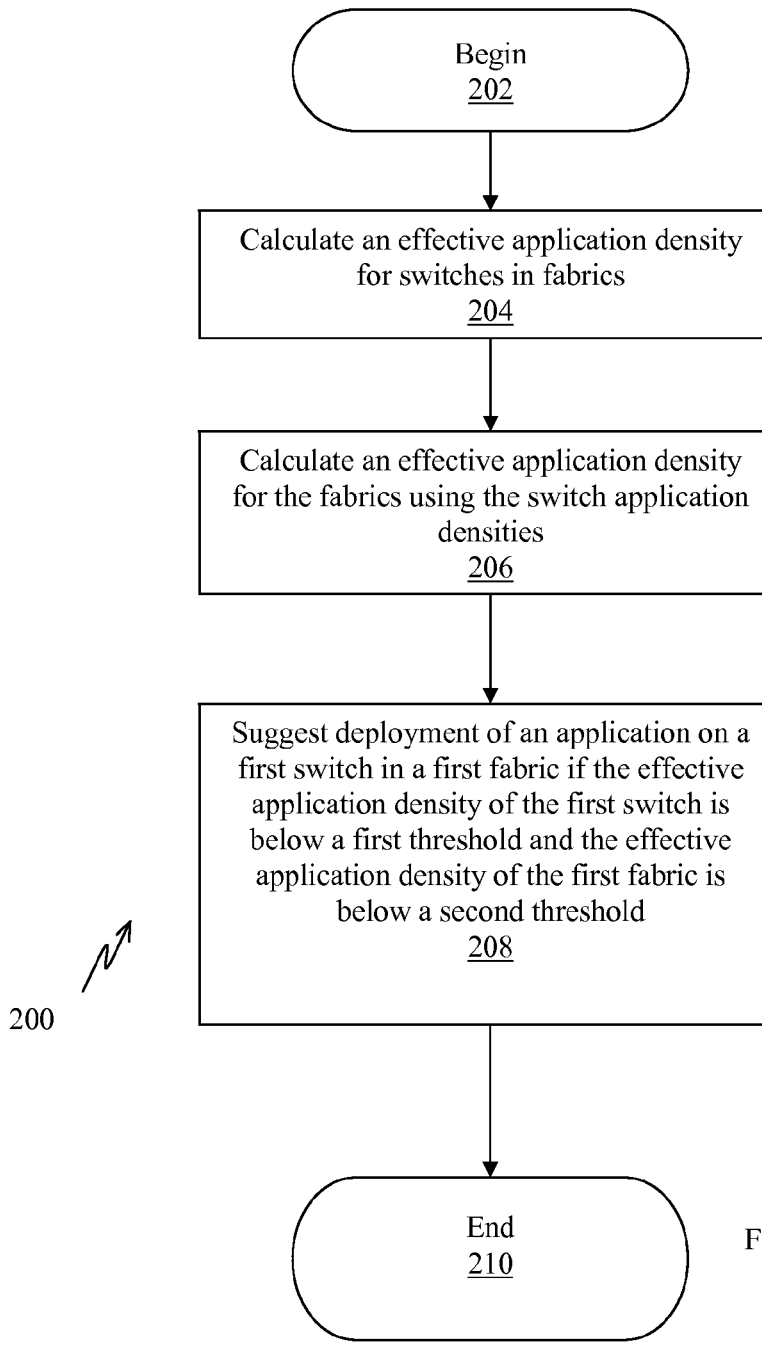
FIG. 2 illustrates a method of calculating effective application densities for fabrics in accordance with various illustrated examples.

FIG. 2 illustrates a method 200 of calculating switch application density, fabric application density, effective switch application density, and effective fabric application density and making recommendations beginning at 202 and ending at 210 in accordance with at least some illustrated examples. The actions depicted in FIG. 2 may be performed by a processor coupled to memory and may by performed in the order shown or in a different order. For example, the actions may be performed by a processor or device in the system 100 such as a server 116. In at least one example, storage area network ("SAN") infrastructure elements may be analyzed based the distribution of storage access paths for applications already installed applications. The analysis may be used to recommend a configuration for effectively installing a prospective application. Also, the recommendations may be based on the criticality of the prospective application. For example, a highly critical application should be installed in such a configuration to ensure the application is available.

A discussion of terms will be helpful. A SAN logical unit number ("LUN") is a storage unit assigned to an application over SAN. A LUN path is an individual path between two network elements. A multipath LUN has multiple paths, e.g., through different network elements or ports, to communicate. A storage resource management ("SRM") application is an application developed to manage and report details about storage resources running in a datacenter. An application density is the number of LUN paths distributed across the network.

At 204, an effective application density is determined for switches in fabrics. For example, switches or ports may be categorized into 3 tiers based on speed (high speed, mid-range speed, and low speed). As another example, switches may be ordered based on a gigabytes per second ("Gbps") metric. Based on the tier or speed, a port weight is assigned. The port weight may be an integer from 0 to 100 inclusive or a fraction between 0 and 1 inclusive. Port weights are indirectly proportional to switch tier and port speed. As illustrated in the following table, port weights may be assigned based on speed. For example, a speed of 10 Gbps is assigned the highest port weight of 1, and the lower speeds are assigned a proportionally lower port weight.

| Switch Tier | Speed (Gbps) | Port weight |
|---|---|---|
| High | 10 | 1.0 |
|  | 8 | .75 |
| Mid | 8 | .75 |
|  | 4 | .50 |
| Low | 4 | .50 |
|  | 2 | .25 |

Port weights may also be assigned based on tier. For example, a high tier switch or port may be assigned a port weight of 100, mid-range may be assigned 50, and low may be assigned 0. In at least one example, both tier and speed are used to assign port weights.

The number of applications whose storage access paths pass through a particular switch may be identified in the following manner. A counter, e.g., a switch application density variable ("switch_app_density"), may be initialized to zero. For each currently installed application, the LUNs used by that application may be identified. For each LUN identified, the number of paths to storage volumes may be counted. The information may be obtained from a database, from traversal of a tree or topology map, or as input from a user. For each LUN path, if a particular switch is part of the LUN path, add (1—port weight) to the switch application density for that particular switch, LUN, and application (if fractions are being used).

Once the final switch application density is calculated for each switch, the switch effective application density for a particular switch can be determined as the particular switch's application density divided by the sum of the switch application densities for each switch.

At 206, an effective application density is determined for the fabrics using the switch application densities. The fabric effective application density may be broken into components, which may be calculated first. Fabric application density may be computed by summing the switch application densities for each switch in a particular fabric. Total port weight may be computed by summing the port weights for each switch in the fabric. Free port weight may be computed by summing (1—port weight) for each switch in the fabric. As such, the free port density may be computed by dividing the free port weight by the total port weight.

Another component of the fabric effective application density may be the availability index. To determine the availability index, the total number of applications having storage access paths through the fabric may be determined. The information may be obtained from a database, from traversal of a tree or topology map, or as input from a user. Next, the switches may be sorted based on the number of application storage access paths passing through each switch. Finally, for a particular switch, the total number of applications through the fabric containing the particular switch and the ratio between number of applications passing through the particular switch may be found. These ratios may be tiered into categories. For example, if the ratio is greater than or equal to 70%, then the fabric may be considered under light load. If the ratio is greater than 60% but less than 70%, then the fabric may be considered under moderate load. If the ratio is less than or equal to 60%, then the fabric may be considered under heavy load.

Having computed the components, the fabric effective application density may be expressed as $$\text{Fabric Effective Application Density} = K * FAD / (FPD * AI) \quad (1)$$

where K is a normalization constant, FAD is the fabric application density, FPD is free port density, and AI is availability index. For example, K may be a fraction such that all fabric effective application densities are between 0 and 110.

At 208, deployment of an application on a first switch in a first fabric is suggested if the effective application density of the first switch is below a first threshold and the effective application density of the first fabric is below a second threshold. For example, the suggestion may be displayed via GUI 110 to an user using workstation 103. The thresholds may be pre-determined or may be variable in various examples. The user may decide to accept or reject the suggestion using GUI 110. In at least one embodiment, the user is given multiple suggestions and may decide to accept one, none, or more than one suggestion. If the user accepts, the application is installed in the suggested configuration. Furthermore, the zoning of the switches may be altered in response to an accepted suggestion.

Variations in the different determinations of metrics and equation 1 can be implemented as well. In at least one example, the effective application density may be determined for a switch based on port weight associated with ports residing on the switch and the number of logical unit number paths that include the ports used by other applications. Also, the effective application density may be determined for a fabric based on the difference between the number of number of logical unit number paths that include the fabric and the number of number of logical unit number paths that include the switch in at least one example. Additionally, deployment of the application may be suggested based on the criticality of the application and an ability of the first switch in at least one example.

Considering the above, many suggestions can be made for many applications including negative suggestions, i.e., a suggestion against deploying an application using a particular configuration. For example, a suggestion against deployment of another application on a second switch in a second fabric may be made if the effective application density of the second switch is above a third threshold and the effective application density of the second fabric is above a fourth threshold. In at least one example, the switches are ranked according to speed, and port weights are assigned to ports residing on the ranked switches proportional to rank.

The following tables list examples of recommendations based on fabric effective application densities. The recommendations may be implemented based on a positive or negative confirmation selection by a user.

| Fabric 1: Fabric Effective Application Density (EAD): 29.63 | | |
|---|---|---|
| Switch Name | Switch Density | Recommendations |
| Switch 1 | 12 | New and Critical Application can be deployed on this switch |
| Switch 2 | 25 | New and medium critical Application can be deployed on this switch |
| Switch 3 | 35 | New and less critical Application can be deployed on this switch |

| Fabric 2: Fabric Effective Application Density (EAD): 53 | | |
|---|---|---|
| Switch Name | Switch Density | Recommendations |
| Switch 1 | 35 | New and less critical Application can be deployed on this switch |
| Switch 2 | 10 | New and Critical Application can be deployed on this switch |
| Switch 3 | 75 | No Application can be deployed |
| Switch 4 | 25 | New and less critical Application can be deployed on this switch |

| Fabric 3: Fabric Effective Application Density (EAD): 106 | | |
|---|---|---|
| Switch Name | Switch Density | Recommendations |
| Switch 1 | 60 | Applications on this switch are at low risk |
| Switch 2 | 80 | Applications on this switch are at medium risk |
| Switch 3 | 90 | Applications on this switch are at high risk |

Figure 3:
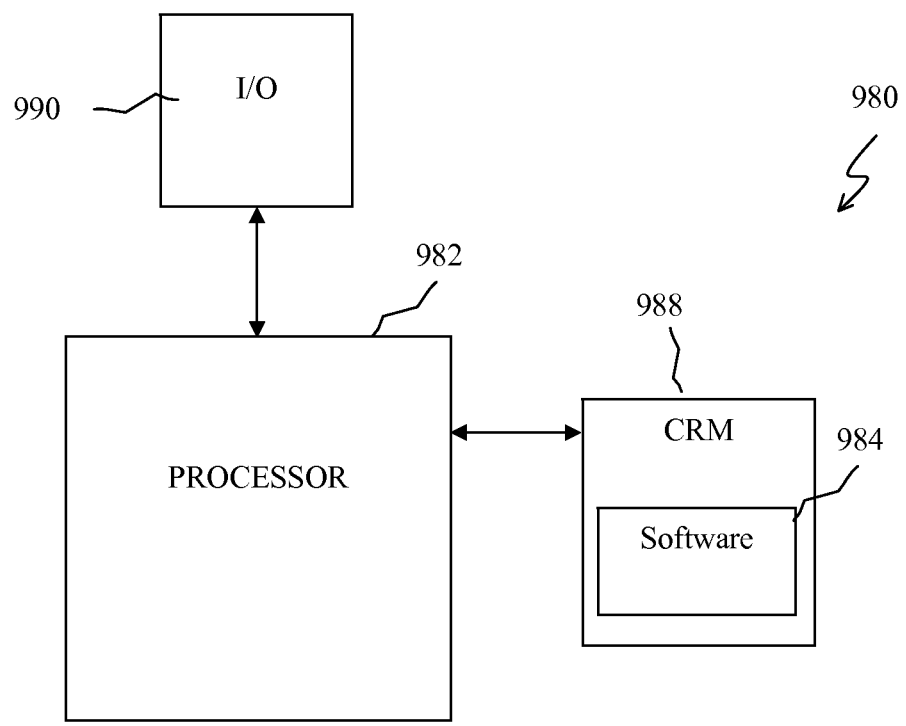
FIG. 3 illustrates a device and computer readable medium storing instructions for calculating effective application densities for fabrics in accordance with various illustrated examples.

The system described above may be implemented on any particular machine or computer with sufficient processing power, memory resources, and throughput capability to handle the necessary workload placed upon the computer. FIG. 3 illustrates a particular computer system 980 suitable for implementing one or more examples disclosed herein.

The computer system 980 includes a hardware processor 982 (which may be referred to as a central processor unit or CPU) that is in communication with memory devices including storage 988, and input/output (I/O) 990 devices. The processor may be implemented as one or more CPU chips.

In various examples, the storage 988 comprises a non-transitory storage device such as volatile memory (e.g., RAM), non-volatile storage (e.g., Flash memory, hard disk drive, CD ROM, etc.), or combinations thereof. The storage 988 comprises a computer readable medium ("CRM") comprising software 984 (i.e., machine executable instructions) that is executed by the processor 982. One or more of the actions described herein are performed by the processor 982 during execution of the software 984.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A non-transitory machine-readable storage device comprising executable instructions that, when executed, cause one or more processors to:
   calculate an effective application density for each switch in each of a plurality of fabrics based on port weights associated with each port on each such switch and a number of logical unit number (LUN) paths that include ports used by other applications;
   calculate an effective application density for each fabric based on, for each switch in the fabric, the difference between the number of LUN paths that include the fabric and the number of LUN paths that include each such switch; and
   suggest, and output for display the suggestion, deployment of an application based on:
      a first switch in a first fabric if the effective application density of the first switch is below a first threshold and the effective application density of the first fabric is below a second threshold; and
      a criticality level of the application.

2. The storage device of claim 1, wherein the executable instructions, when executed, further causes the one or more processors to suggest against deployment of another application on a second switch in a second fabric if the effective application density of the second switch is above a third threshold and the effective application density of the second fabric is above a fourth threshold.

3. The storage device of claim 1, wherein the executable instructions, when executed, further causes the one or more processors to rank the switches according to speed and assign a port weight to ports residing on the ranked switches proportional to rank.

4. The storage device of claim 1, wherein the executable instructions, when executed, further causes the one or more processors to suggest deployment of the application based on an ability of the first switch.

5. The storage device of claim 1, wherein the executable instructions, when executed, further causes the one or more processors to calculate the effective application density for each fabric based on a fabric application density divided by a product of a free port density for the fabric and an availability index;
   wherein the fabric application density includes a sum of switch application densities of each switch in the fabric;
   wherein the free port density is computed as a ratio of a sum of weights of unused ports in the fabric to the sum of weights of all ports in the fabric; and
   wherein the availability index is computed based on a difference between a total number of LUNs passing through the fabric and the number of LUNs passing through each switch.

6. A method, comprising:
   calculating, by a processor, an effective application density for each switch in each of a plurality of fabrics based on port weights associated with each port on each such switch and a number of logical unit number LUN paths that include ports used by other applications;
   calculating, by the processor, an effective application density for each fabric based on, for each switch in the fabric, the difference between the number of LUN paths that include the fabric and the number of LUN paths that include each such switch; and
   suggesting, and output for display the suggestion, by the processor, deployment of an application based on:
      a first switch in a first fabric if the effective application density of the first switch is below a first threshold and the effective application density of the first fabric is below a second threshold; and
      a criticality level of the application.

7. The method of claim 6, further comprising recommending, by the processor, against deployment of another application on a second switch in a second fabric if the effective application density of the second switch is above a third threshold and the effective application density of the second fabric is above a fourth threshold.

8. The method of claim 6, further comprising ranking, by the processor, the switches according to speed and assign a port weight to ports residing on the ranked switches proportional to rank.

9. The method of claim 6, further comprising recommending, by the processor, deployment of the application based on an ability of the first switch.

10. The method of claim 6 further comprising:
    calculating a fabric application density as a sum of switch application densities of each switch in the fabric;
    calculating a free port density as a ratio of a sum of weights of unused ports in the fabric to the sum of weights of all ports in the fabric;
    calculating an availability index based on a difference between a total number of LUNs passing through the fabric and the number of LUNs passing through each switch; and
    calculating the effective application density for each fabric based on the fabric application density divided by a product of the free port density for the fabric and the availability index.

11. A device, comprising:
    a processor;
    a memory coupled to the processor;
    the processor to
       calculate an effective application density for each switch in each of a plurality of fabrics based on port weights associated with each ort on each such switch and a number of logical unit number (LUN) paths that include ports used by other applications;
       calculate an effective application density for each fabric based on, for each switch in the fabric, the difference between the number of LUN paths that include the fabric and the number of LUN paths that include each such switch; and suggest, and output for display the suggestion, deployment of an application based on:
  a first switch in a first fabric if the effective application density of the first switch is below a first threshold and the effective application density of the first fabric is below a second threshold; and
  a criticality level of the application.

12. The device of claim 11, the processor to suggest deployment of the application based on an ability of the first switch.

13. The device of claim 11, the processor to suggest an alternate deployment of the application on a second switch in the first fabric simultaneously with the suggestion of deployment on the first switch.

14. The device of claim 11, the processor to initiate deployment based on receiving acceptance of the suggestion.

15. The device of claim 11, wherein the processor is to:
  calculate a fabric application density as a sum of switch application densities of each switch in the fabric;
  calculate a free port density as a ratio of a sum of weights of unused ports in the fabric to the sum of weights of all ports in the fabric;
  calculate an availability index based on a difference between a total number of LUNs passing through the fabric and the number of LUNs passing through each switch; and
  calculate the effective application density for each fabric based on the fabric application density divided by a product of the free port density for the fabric and the availability index.

* * * * *

UNITED STATES PATENT AND TRADEMARK OFFICE
CERTIFICATE OF CORRECTION

PATENT NO.         : 8,811,210 B2
APPLICATION NO.    : 13/372175
DATED              : August 19, 2014
INVENTOR(S)        : Reddy C. Narsimha et al.

It is certified that error appears in the above-identified patent and that said Letters Patent is hereby corrected as shown below:

In the Claims

In column 6, line 12, in Claim 6, delete "unft" and insert -- unit --, therefor.

In column 6, line 12, in Claim 6, delete "LUN" and insert -- (LUN) --, therefor.

In column 6, line 60, in Claim 11, delete "ort" and insert -- port --, therefor.

Signed and Sealed this
Third Day of February, 2015

Michelle K. Lee
*Deputy Director of the United States Patent and Trademark Office*